United States Patent Office 3,255,921
Patented June 14, 1966

3,255,921
CONTROL OF FLOW OF PARTICULATE SOLID
MATERIALS THROUGH PIPES
Geoffrey Frank Eveson and George Thomas Richards, Sheffield, England, assignors to Head, Wrightson & Company Limited, Thornaby-on-Tees, England, a corporation of Great Britain
Filed Oct. 12, 1964, Ser. No. 403,226
Claims priority, application Great Britain, Oct. 24, 1963, 42,077/63
11 Claims. (Cl. 222—1)

This invention concerns improvements relating to control of flow of particulate solid materials through pipes.

According to the invention, control of flow of particulate solid material through a pipe is effected in the presence of a particulate magnetic solid material in the flow and utilising the latter material during the flow as the core of a transformer associated with a transducer that is operatively connected with a flow-control valve device in the pipe and is responsive to the output from said transformer.

In the case where the pipe is of iron or other electrically conducting material, it would have inserted in it, as part of its length, a section of electrically non-conducting material on which the transformer coils are wound.

Means are suitably provided for preventing the current flowing through the transducer from exceeding the maximum value for which the same is designed.

The invention is of advantageous application in processes for the separation of particulate solid materials of different specific gravities, e.g. coal, into their components of relatively high and low density, in a fluidised bed of discrete solid particles of magnetite or other magnetic material hereinafter referred to for convenience as "magnetite." On discharge from the bed, some magnetite inevitably discharges with such components and that, during its flow in a discharge pipe, may serve as the core of the transformer.

Figure 1:
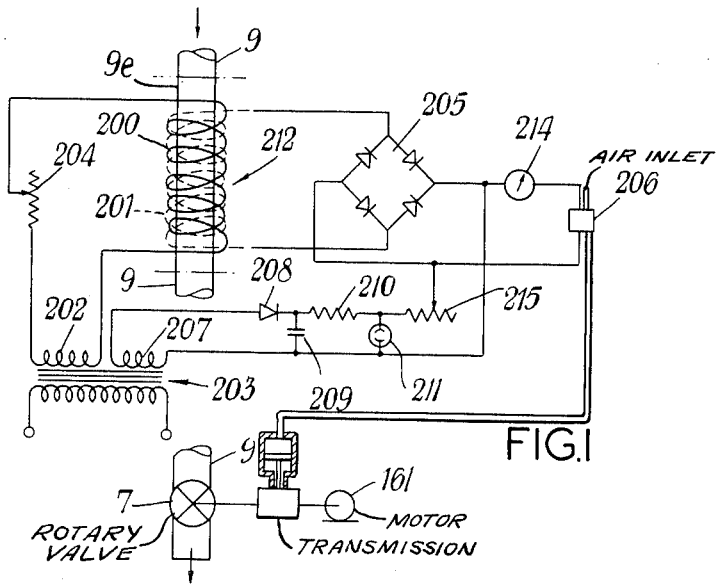
Figure 2:
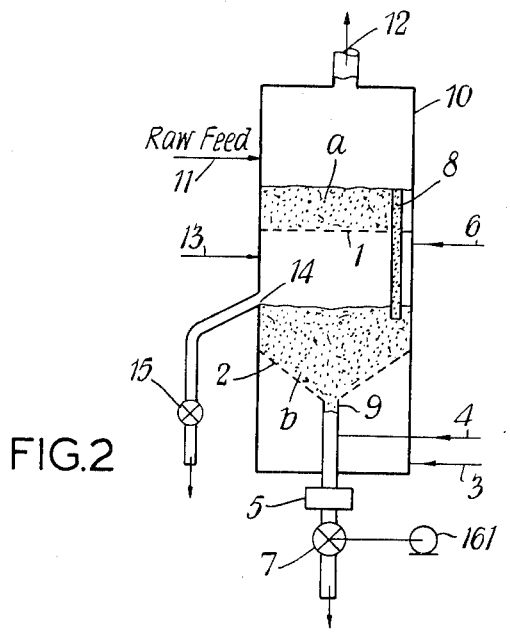

One system of this nature, by way of example, will be hereinafter described with the aid of the accompanying diagrammatic drawing in which FIGURE 1 is a circuit diagram of the control system, and FIGURE 2 shows one example of coal cleaning apparatus to which the control system of FIGURE 1 is applied.

Referring more particularly to FIGURE 2 of the drawing the coal cleaning apparatus comprises a cylindrical fluidising vessel containing two perforate supports 1 and 2 for material to be treated.

The upper perforate support is flat whilst the lower perforate support 2 is conical. The upper perforate support 1 is shown provided with a cylindrical overflow pipe 8 leading to the lower support 2 whilst the lower perforate support 2 is shown opening downwardly into a centrally disposed discharge pipe 9. In the pipe 9 is provided a gas-tight discharge device 7 having a variable control motor 161. The device 7 may, for example, be a rotary valve. The vessel 10 also has a discharge opening 14 above the perforate support 2 and leading to gas-tight valve 15.

Heated (or unheated) fluidising gas is admitted to the fluidising vessel at points 3, 4 and 6 under controlled volume or mass and, if heated, temperature at each point. Gas outlet 12 is provided at the top of the vessel.

The coal, so called raw feed, to be treated is fed at 11 continuously into the fluidising vessel 10 above the upper perforate support 1. The fluidising gas forms the raw feed into a fluidised bed $a$ on the support 1 and thus partially or completely dries the feed material. The mass flow of gases into the fluidising vessel, is controlled so that it is adequate to entrain particles finer than a predetermined size so that they are carried out of the fluidising vessel at 12.

A fluidising bed $b$ of discrete solid particles of magnetite is formed on the support 2. The magnetite is continuously supplied to the bed $b$ as at 13. The admission of magnetite is such that, in association with the controlled mass flow of gases admitted to the fluidising vessel at points 3 and 4, the fluidised bed $b$ is given an effective specific gravity of the value at which it is desired to separate the raw feed.

The overflow pipe indicated at 8 operates for continuous discharge of material from the fluidised bed $a$ into the fluidised bed $b$. The overflow pipe 8 protrudes for a predetermined depth into the fluidised bed $b$ in order to prevent excessive escape of gases.

In the bed $b$ the raw feed is separated into relatively low and high density fractions determinated by the effective specific gravity of the bed $b$. The low density fraction, i.e. the "floats" product, continuously overflows through outlet 14 together with magnetite and the high density fraction, i.e. the "sinks" product, for example shale, continuously discharges through pipe 9 through the gas-tight valve 7 together with magnetite.

In order to avoid unnecessarily large quantities of magnetite from discharging through outlet pipe 9, gas is admitted at 4. The gas is admitted at 4 at a controlled rate and by an elutriating action prevent all but an acceptably small quantity of magnetite from being discharged. As will be appreciated from the latter description the sensing and control system may obviate the need for admission of gases at 4.

The "sinks" and "floats" products mixed with magnetite are then treated in known manner using for example screens and magnetic separators to separate out the magnetite which is then recirculated to the fluidising vessel 10.

In FIGURE 2 a sensing and control system as applied to the "sinks" product is shown by the block 5 the form of which is shown in more detail in FIGURE 1. FIGURE 1 illustrates the vertical down pipe 9 (shown partly broken away) having near the lower end the rotary gas seal 7 or similar discharge device with its variable speed motor 161.

In accordance with the present invention, a section 9c, say about four feet long, inserted in the pipe 9 is made of an electrically non-conducting material, e.g. glass, ceramic or the material known as "Fluon." On this section, which is suggested by the dot-and-dash lines in the drawing, two coils are wound of which the one 200 (shown in a full line) may be regarded as a primary winding and the other 201 (shown in dotted line) as a secondary winding which coils, as will be shown, operate, with the discharging magnetite as core, as a transformer (212) and will be hereinafter referred to as such. Thus the section 9e constitutes a former for the core and a support for the windings. For convenience, one coil may be assumed to be wound on top of the other although the number of turns in one coil may be different from that in the other and the thickness of the wire used in one coil may be different from that used in the other.

A voltage is applied to the primary winding 200 from a secondary tapping 202 of a suitable main transformer 203. Variation in voltage is obtained by means of a potentiometer 204. The current induced in the secondary winding 201 and its associated circuit by the primary 200 is rectified by means of a full-wave rectifying bridge 205, and applied to an electro-pneumatic transducer 206. The magnitude of the current induced in the secondary circuit 201, for a given voltage applied to the primary winding 200, depends upon the coupling factor between the primary and secondary windings. For a given geometrical configuration of the primary and secondary windings, the coupling factor is dependent on the magnetic permeability of the discard material passing down that section 9e of the down-pipe 9 which lies within the windings. As magnetite has a permeability greater than that of air or shale, the current flowing through the transducer 206 will increase with increase in the proportion of magnetite present within the fields of the windings 200 and 201. This magnetite is that which discharges along with the shale from the fluidised bed down the pipe 9. As will be realised it acts as a core for the transformer 212.

The transducer 206 is supplied with air at a pressure of, say, 30 p.s.i. As the current input to the transducer increases over the range, say, 1–5 mA. the pressure of the pneumatic output of the transducer increases over the range, say, 3–15 p.s.i. This pneumatic output is applied to a power cylinder operating a variable-speed gear on the motor 161 driving the rotary seal 7. It may be arranged for the output speed of the variable-speed gear to increase, or to decrease, with increase in the pressure of the pneumatic output of the transducer.

It is important that current flowing through the transducer 206 should not exceed the maximum value (e.g. 5 mA., D.C.) for which it is designed. A suitable safety precaution is a D.C. milliammeter 214 in the circuit of the secondary winding 201. A further secondary tapping 207 of the mains transformer 203 is used to supply a current which is rectified at 208 and smoothed (e.g. using the filter circuit denoted by 209 and 210). The voltage may be stabilised, if desired, by means of a suitable diode 211 or solid-state voltage stabiliser. The current output of this circuit is caused to oppose the current flowing in the circuit of the secondary winding 201. Adjustment of the potentiometer 215 enables the magnitude of this opposing, or backing-off, current to be varied so that the current flowing through the transducer 206 is at all times maintained below the maximum permissible value.

The control system described above may be designed to effect the following range of operations. When only air, or shale (which has approximately the same relative permeability), fills the vertical pipe within the primary and secondary windings 200, 201, the current flowing through the transducer 206 is a minimum (e.g. 1 mA.) and the pressure of the pneumatic output of the transducer 206 is also a minimum (e.g. 3 p.s.i.). It is arranged that, under these conditions, the speed of rotation of the rotary gas seal 7 is a maximum. As the concentration of magnetite in the section 9e of the vertical pipe lying within the primary and secondary windings 200 and 201 increases, the current flowing through the transducer 206 increases until, when the highest possible concentration (say 50 percent by volume) exists, the current is the maximum (e.g. 5 mA.) which can be passed through the transducer. The pressure of the pneumatic output of the transducer is then a maximum (e.g. 15 p.s.i.) and the speed of rotation of the rotary seal is a minimum.

When only magnetite is being fed to the lower fluidised bed, the rate of extraction through the rotary seal is a minimum and the fluidised bed of magnetite may be established rapidly. When raw coal is being cleaned within the fluidised bed of magnetite, the amount of shale entering the discard pipe 9 will probably vary with time in a random manner but the control system functions so that, as the amount of shale increases, so the speed of the rotary valve increases. Automatic control of shale extraction is therefore established.

The above control system will operate provided that, for instance:

(i) the discrete solid particles, used in the preparation of the fluidised-bed cleaning stage, have a magnetic permeability greater than that of air whilst the discard fraction derived from the raw feed has a permeability approximately equal to, or less than, that of air, or (ii) the discrete solid particles have a magnetic permeability less than, or equal to, that of air whilst the discard fraction has a permeability greater than that of air. In these circumstances, arrangements would be made for the speed of rotation of the rotary seal to increase with increase in the pressure of the pneumatic output of the transducer.

It will be understood that the system described above will operate whether or not gaseous medium is admitted through 4 to the pipe 9 at a point above or below the level of the bottom of the primary and secondary windings.

The automatic control of the shale extraction will also entail a similar control of the magnetic extraction along with the shale.

As will be appreciated various minor modifications could be made to the circuit configuration of FIGURE 2 without departing from the scope of the invention. For example the rectifier 208 and the smoothing circuit 209, 210 may be replaced by a full wave rectifier; the voltage stabilizer 211 would then be omitted.

The basic principles of the operation of the present system may find application in various ways and, as further particular examples, mention may be made of the following:

(a) Controlling the removal of one, or more, products prepared from an ore containing a magnetic mineral in a dry or wet benefication process. For instance, the operation of a pulsed, or unpulsed, upward current, classifier-type concentrator could be controlled by this means so that the heavy fraction (probably the magnetic fraction) is discharged from the base of the apparatus at a controlled but variable rate to maintain a substantially constant thickness of the stratified layer of magnetic fraction within the apparatus.

(b) Controlling the operation of, say a gravitational sedimentation vessel thickening a finely-divided magnetic material so that the solids concentration in the underflow from the vessel remains sensibly constant at any given predetermined value.

We claim:
1. A process for controlling the flow of particulate solid material through a pipe from a bed of said material wherein said bed is supplied with gas from below to fluidize said material and wherein said material contains particulate magnetic solid material utilizing said material in said pipe as an electro-magnetic core so that the variation in proportion of said particulate magnetic solid material present varies the permeability of the core and discharging part of said material in accordance with the permeability of said material.

2. A process for controlling the flow of particulate solid material through a pipe from a bed of said material, wherein said bed is supplied with gas from below to fluidize said material, and wherein discrete solid particles of a magnetic nature are admixed with said particulate solid material before the latter enters said pipe utilizing said material in said pipe as an electro-magnetic core so that the variation in proportion of said discrete solid particles of a magnetic nature in the mixture varies the permeability of the core and regulating discharge of part of said material according to the contents of said core of particles of electro-magnetic nature.

3. Apparatus for separating particulate material containing relatively heavy, magnetic sinks, and a lighter float, into these components according to their density, comprising means forming a bed of said material, means supplying gas to said bed to fluidize said material and cause stratification of said components, an overflow at the upper region of said bed for said float, a discharge conduit at the lower region of said bed to receive said magnetic sink, an electric transformer of which a portion of said conduit constitutes a former for the core, a flow controller for said conduit arranged to be controlled by said transformer in accordance with the magnetic characteristics of said core.

4. An apparatus according to claim 3, wherein said conduit has at least one electrically conducting portion, and wherein the coils of said transformer are wound on said electrically non-conducting section constituting said former.

5. An apparatus according to claim 3, wherein control means are provided for preventing current flow through said flow controller from exceeding a predetermined value.

6. An apparatus according to claim 5, wherein said control means comprises electric supply means connected to supply a variable current to the circuit of said flow controller in opposition to the current supplied by said transformer to said flow controller.

7. An apparatus according to claim 3, wherein said flow controller is an electro-pneumatic flow controller having a pneumatic output and includes a rotary gas seal whose speed of rotation is controlled in dependence upon the pneumatic output from said flow controller.

8. An apparatus according to claim 7, wherein the pneumatic output of said flow controller is applied to a power cylinder which in turn is arranged to operate a variable speed gear on an electric motor arranged to rotate said rotary seal.

9. Apparatus according to claim 3, wherein said portion of said conduit which serves as the former for the core of said transformer is comprised of electrically non-conducting material.

10. Apparatus for separating particulate material into at least two parts acording to the density of the particles comprising a bed of material, means for supplying gas to said bed of material from below to fluidize said material, a pipe extending downwards from the lower side of said bed and serving as an outlet for guiding the higher density particles from the lower side of said bed, an electric transformer of which said pipe constitutes a former for the core thereof so that material flowing through said pipe will form the core of said transformer, and a flow control device arranged to be actuated by said transformer in accordance with the magnetic characteristics of said core.

11. Apparatus for separating particulate material containing relatively heavy sinks, and a lighter float, into these components according to their density, comprising means forming a bed containing magnetic material, means supplying gas to said bed to fluidize said material and cause stratification of said components, an overflow at the upper region of said bed for said float, a discharge conduit at the lower region of said bed to receive said sinks including said magnetic material, an electric transformer of which said conduit constitutes a former for the core, a flow controller for said conduit arranged to be controlled by said transformer in accordance with the magnetic characteristics of said core.

References Cited by the Examiner
UNITED STATES PATENTS

| | | | |
|---|---|---|---|
| 2,764,316 | 9/1956 | Sylvest | 222—55 |
| 2,909,303 | 10/1959 | Henderson et al. | 222—57 |
| 2,962,150 | 11/1960 | Halley et al. | 222—55 X |

LOUIS J. DEMBO, *Primary Examiner.*

HADD S. LANE, *Examiner.*